US007982435B2

(12) United States Patent
Masuda

(10) Patent No.: US 7,982,435 B2
(45) Date of Patent: Jul. 19, 2011

(54) BATTERY CHARGING AND DISCHARGING CONTROL APPARATUS

(75) Inventor: Eiji Masuda, Toyota (JP)

(73) Assignee: Denso Corporation, Kariya (JP)

( * ) Notice: Subject to any disclaimer, the term of this patent is extended or adjusted under 35 U.S.C. 154(b) by 408 days.

(21) Appl. No.: 12/198,451

(22) Filed: Aug. 26, 2008

(65) Prior Publication Data
US 2009/0058366 A1 Mar. 5, 2009

(30) Foreign Application Priority Data
Aug. 27, 2007 (JP) ................................. 2007-219540

(51) Int. Cl.
H02J 7/00 (2006.01)
(52) U.S. Cl. ........................................ 320/136; 320/132
(58) Field of Classification Search .................. 320/132, 320/136; 324/427, 428, 429, 430; 702/63
See application file for complete search history.

(56) References Cited

U.S. PATENT DOCUMENTS

| 6,075,346 | A | 6/2000 | Kikuchi et al. | |
|---|---|---|---|---|
| 6,285,163 | B1 * | 9/2001 | Watanabe et al. | 320/132 |
| 6,441,619 | B1 * | 8/2002 | Araki et al. | 324/427 |
| 6,870,336 | B2 | 3/2005 | Murakami et al. | |
| 7,812,468 | B2 * | 10/2010 | Kuroda et al. | 290/40 C |

FOREIGN PATENT DOCUMENTS

| JP | 2000-002758 | 1/2000 |
|---|---|---|
| JP | 2006-101674 | 4/2006 |
| JP | 2006-211789 | 8/2006 |
| JP | 2007-022240 | 2/2007 |

OTHER PUBLICATIONS

Machine translation of JP 2000-002758, Watanabe et. al., Maximum Input/Output Power Estimating Device for Battery, Jul. 1, 2000.*
Machine translation of JP2006-211789, Kimura et. al., Power Output Device, Automobile Mounting It and Control Method of Power Output Device, Aug. 10, 2006.*
Japanese Office Action dated Aug. 18, 2010, issued in corresponding Japanese Application No. 2007-219540, with English translation.

* cited by examiner

Primary Examiner — Edward Tso
Assistant Examiner — Samuel Berhanu
(74) Attorney, Agent, or Firm — Nixon & Vanderhye P.C.

(57) ABSTRACT

A battery charging-discharging control apparatus includes an estimation circuit, a detection circuit, and a control circuit. The estimation circuit estimates an internal resistance of a battery. The detection circuit detects a charging-discharging current of the battery. The control circuit predicts a behavior of a voltage of the battery based on behaviors of the internal resistance and the charging-discharging current of the battery. The control circuit limits the charging-discharging current or a charging-discharging power of the battery based on the predicted behavior of the battery voltage in such a manner that the battery voltage is within a predetermined voltage range.

6 Claims, 7 Drawing Sheets

US 7,982,435 B2

BATTERY CHARGING AND DISCHARGING CONTROL APPARATUS

CROSS REFERENCE TO RELATED APPLICATION

This application is based on and incorporates herein by reference Japanese Patent Applications No. 2007-219540 filed on Aug. 27, 2007.

FIELD OF THE INVENTION

The present invention relates to a control apparatus for controlling charging-discharging of a battery mounted on a vehicle.

BACKGROUND OF THE INVENTION

JP-A-2006-211789 (in particular, pages 12-13, and FIG. 11) discloses a technique for preventing a battery mounted on a hybrid electric vehicle (HEV) from being overcharged and overdischarged. According to the conventional technique, an internal resistance of the battery is estimated based on a temperature of the battery, and a control range of the battery is determined based on the estimated internal resistance. The charging-discharging of the battery is controlled so that a voltage of the battery can be limited within the control range.

The battery voltage may vary due to internal conditions of the battery other than the battery internal resistance. For example, the battery voltage may vary due to a charging-discharging current of the battery and the state of charge (SOC) of the battery.

As described above, the conventional technique disclosed in JP-A-2006-211789 controls the charging-discharging of the battery based on only the internal resistance of the battery without taking into considerations other battery internal conditions such as the charging-discharging current and the state of charge of the battery. Therefore, as shown in FIG. 3, although the battery inherently has a wide charging-discharging performance range, the charging-discharging of the battery is controlled in a narrow range. As a result, the charging-discharging performance of the battery cannot be used efficiently.

SUMMARY OF THE INVENTION

In view of the above-described problem, it is an object of the present invention to provide an apparatus for controlling charging-discharging of a battery mounted on a vehicle in such a manner that a charging-discharging performance of the battery can be efficiently used.

According to an aspect of the present invention, an apparatus for controlling charging-discharging of a battery mounted on a vehicle includes an estimation circuit, a detection circuit, and a control circuit. The estimation circuit estimates an internal resistance of the battery. The detection circuit detects a charging-discharging current of the battery. The control circuit predicts a behavior of a voltage of the battery based on behaviors of the internal resistance and the charging-discharging current of the battery. The control circuit limits the charging-discharging current or a charging-discharging power of the battery based on the predicted behavior of the battery voltage in such a manner that the battery voltage can be within a predetermined voltage range.

According to another aspect of the present invention, an apparatus for controlling charging-discharging of a battery mounted on a vehicle includes an estimation means, a detection means, and a control means. The estimation means estimates an internal resistance of the battery. The detection means detects a charging-discharging current of the battery. The control means predicts a behavior of a voltage of the battery based on behaviors of the internal resistance and the charging-discharging current of the battery. The control means limits the charging-discharging current or a charging-discharging power of the battery based on the predicted behavior of the battery voltage in such a manner that the battery voltage can be within a predetermined voltage range.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
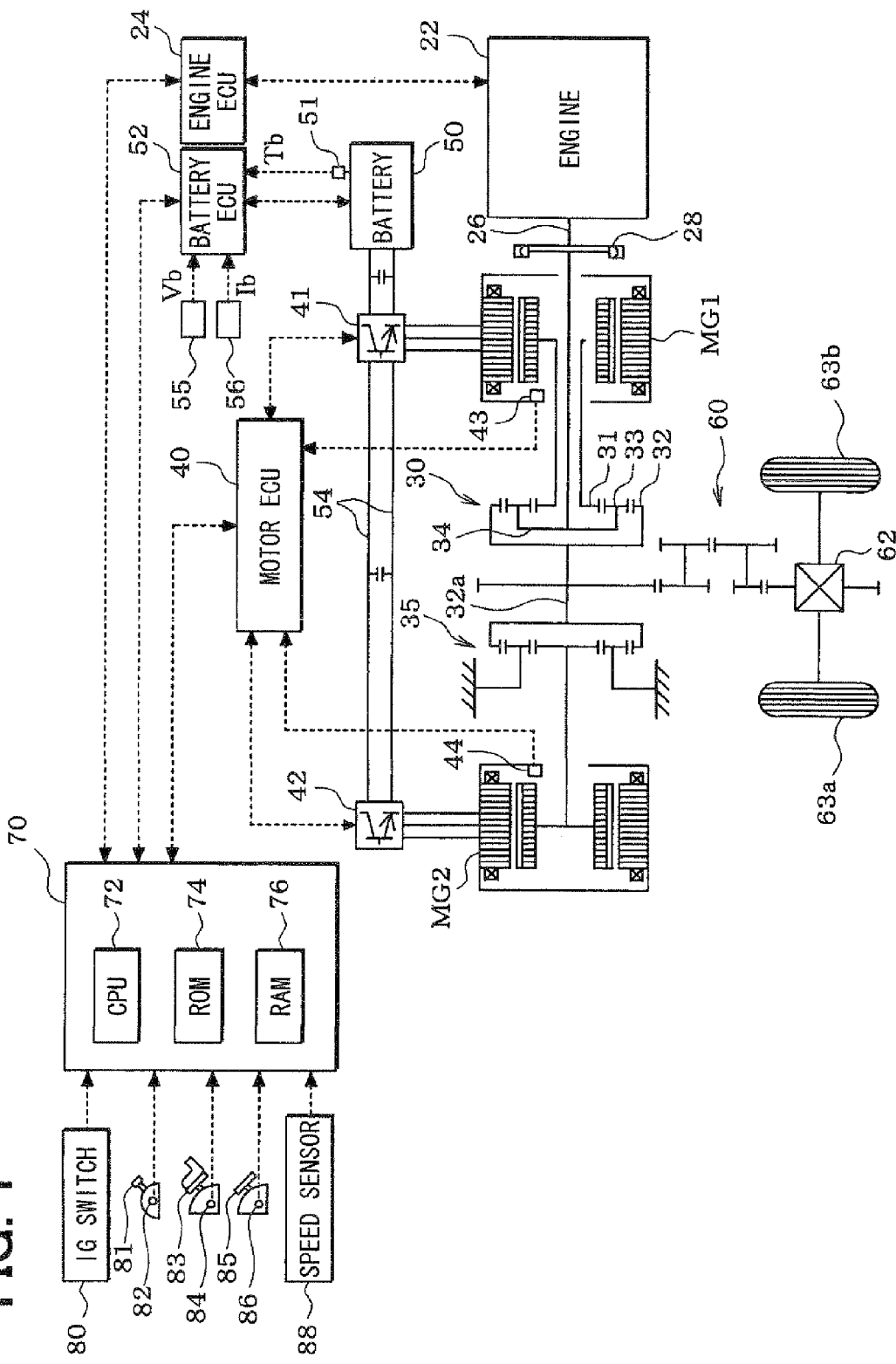
FIG. 1 is a block diagram illustrating a hybrid electric vehicle according to a first embodiment of the present invention.

Referring to FIG. 1, a hybrid electric vehicle (HEV) according to a first embodiment of the present invention has a hybrid drive system and a hybrid electronic control unit (ECU) 70 for controlling the hybrid drive system. The hybrid drive system includes an engine 22, a three-shaft-type power splitting device 30 coupled to a crankshaft 26 of the engine 22 via a damper 28, a first motor MG1 coupled to the power splitting device 30, a reduction gear 35 attached to a ring gear shaft 32a coupled to the power splitting device 30, and a second motor MG2 coupled to the reduction gear 35. The first and second motor MG1, MG2 can serve as an electricity generator.

The engine 22 is an internal combustion engine designed to run on gasoline (i.e., petrol), light oil, or the like. The engine 22 is controlled by an engine ECU 24. The engine ECU 24 receives sensor signals from a crank-angle sensor, an engine coolant temperature sensor, and/or the like. The crank-angle sensor is a device to monitor an operating condition of the engine 22. Based on the received sensor signals, the engine ECU 24 performs various control operations including a fuel injection control, a firing control, and a throttle control. The engine ECU 24 is connected to the hybrid ECU 70 via a communication line and receives a control signal from the hybrid ECU 70. Based on the control signal, the engine ECU 24 controls an operation of the engine 22. Further, if need arises, the engine ECU 24 transmits an engine condition signal, indicating the engine operating condition, to the hybrid ECU 70.

The power splitting device 30 has a planetary gear mechanism. Specifically, the power splitting device 30 includes a sun gear 31, a ring gear 32 arranged concentrically with the sun gear 31, multiple pinion gears 33 engaged with each of the sun gear 31 and the ring gear 32, and a gear carrier 34. The gear carrier 34 supports the pinion gears 33 so that the pinion gears 33 can rotate and revolve.

The gear carrier 34 is coupled to the crankshaft 26 of the engine 22. The sun gear 31 is coupled to the first motor MG1. The ring gear 32 is coupled to the reduction gear 35 via the ring gear shaft 32a. When the first motor MG1 serves as a generator, engine power of the engine 22 transmitted through the gear carrier 34 is distributed between the sun gear 31 and the ring gear 32 in accordance with a gear ratio between the sun gear 31 and the ring gear 32. Conversely, when the first motor MG1 serves as a motor (i.e., vehicle drive source), combined power of the engine power of the engine 22 transmitted through the gear carrier 34 and motor power of the first motor MG1 transmitted through the sun gear 31 is applied to the ring gear 32. Then, the combined power is transmitted from the ring gear 32 to a differential gear 62 via the ring gear shaft 32a and a gear mechanism 60. Finally, the combined power is transmitted to drive wheels 63a, 63b of the vehicle.

Each of the first and second motors MG1, MG2 is a synchronous generator-motor. The first motor MG1 supplies and receives electric power to and from a battery 50 through an inverter circuit 41. The second motor MG2 supplies and receives electric power to and from the battery 50 through an inverter circuit 42. The inverter circuits 41, 42 are connected to the battery 50 via an electric power line 54 having positive and negative lines. The inverter circuits 41, 42 share the power line 54 so that electric power generated by one of the first and second motors MG1, MG2 can be supplied to the other of the first and second motors MG1, MG2. Therefore, the battery 50 is charged and discharged according to a difference between electric power generated by the first and second motors MG1, MG2 and electric power consumed by the first and second motors MG1, MG2.

A motor ECU 40 controls operations of the first and second motors MG1, MG2. The motor ECU 40 receives signals necessary for the motor ECU 40 to control the first and second motors MG1, MG2. For example, the motor ECU 40 receives rotational position signals from rotational position sensors 43, 44 and phase current signals from current sensors (not shown). The rotational position signals indicate rotor positions of the first and second motors MG1, MG2, respectively. The phase current signals indicate phase currents applied to the first and second motors MG1 MG2, respectively. Based on the received signals, the motor ECU 40 outputs switching signals to the inverter circuits 41, 42, respectively. The motor ECU 40 is connected to the hybrid ECU 70 via a communication line and receives a control signal from the hybrid ECU 70.

In accordance with the control signal, the motor ECU 40 controls the operations of the first and second motors MG1, MG2. Further, if need arises, the motor ECU 40 transmits a motor condition signal, indicating operating conditions of the first and second motors MG1, MG2, to the hybrid ECU 70.

A battery ECU 52 controls charging and discharging of the battery 50. The battery ECU 52 receives signals necessary for the battery ECU 52 to control the charging and discharging of the battery 50. For example, the battery ECU 52 receives a voltage signal from a voltage sensor 55, a current signal from a current sensor 56, and a temperature signal from a temperature sensor 51. The current sensor 56 can serve as a current detection means. The voltage sensor 55 is interposed between terminals of the battery 50. The voltage sensor 55 detects a voltage Vb of the battery 50 and outputs the voltage signal indicating the detected voltage Vb. The current sensor 56 is attached to the power line 54 connected to the terminal of the battery 50. The current sensor 56 detects a charging-discharging battery current Ib of the battery 50 and outputs the current signal indicating the detected charging-discharging battery current Ib. The temperature sensor 51 is attached to the battery 50. The temperature sensor 51 detects a battery temperature Tb of the battery 50 and outputs the temperature signal indicating the detected battery temperature Tb. If need arises, the battery ECU 52 transmits a battery condition signal, indicating an operating condition of the battery 50, to the hybrid ECU 70. Further, the battery ECU 52 can calculate (e.g., estimate) the state of charge (SOC) of the battery 50, for example, using an integrated value of the charging-discharging battery current Ib.

The hybrid ECU 70 includes a central processing unit (CPU) 72, a read only memory (ROM) 74, and a random access memory 76. The hybrid ECU 70 receives an ignition signal from an ignition switch 80, a shift position signal from a shift position sensor 82, an accelerator signal from an accelerator pedal sensor 84, a brake signal from a brake pedal sensor 86, and a vehicle speed signal from a vehicle speed sensor 88. The shift position sensor 82 detects a position of a shift lever 81 and outputs the shift position signal indicating the detected shift position. The accelerator pedal sensor 84 detects pressure applied on an accelerator pedal 83 and outputs the accelerator signal indicating the detected pressure on the accelerator pedal 83. The brake pedal sensor 86 detects pressure applied on a brake pedal 85 and outputs the brake signal indicating the detected pressure on the brake pedal 85. The vehicle speed sensor 88 detects a running speed of the vehicle and outputs the vehicle speed signal indicating the detected running speed. As mentioned previously, the hybrid ECU 70 is connected via the communication line to each of the engine ECU 24, the motor ECU 40, and the battery ECU 52. The hybrid ECU 70 transmits and receives various control signals and data signals to and from the engine ECU 24, the motor ECU 40, and the battery ECU 52.

In the hybrid electric vehicle configured in the above-described manner, the amount of torque needed to be applied to the ring gear shaft 32a serving as a drive shaft is calculated based on the signals including the accelerator signal received from the accelerator pedal sensor 84 and the vehicle speed signal received from the vehicle speed sensor 88. The engine 22 and the two motors MG1, MG2 are controlled in such a way that needed power corresponding to the calculated needed torque can be applied to the ring gear shaft 32a.

The engine 22 and the motors MG1, MG2 can be controlled in various modes. For example, the engine 22 and the motors MG1, MG2 are controlled in a torque conversion mode, a charging-discharging mode, and a motor drive mode.

In the torque conversion mode, the engine 22 is controlled in such a way that the engine 22 can output power corresponding to the needed power. The motors MG1, MG2 are controlled in such a way that the power outputted from the engine 22 can be wholly converted to torque through the power splitting device 30 so that the needed torque can be applied to the ring gear shaft 32a.

In the charging-discharging mode, the engine 22 is controlled in such a way that the engine 22 can output power corresponding to the sum of the needed power and electric power needed to charge and discharge the battery 50. The motors MG1, MG2 are controlled in such a way that the power outputted from the engine 22 can be wholly or partially converted to torque through the power splitting device 30 in accordance with the needed electric power, so that the needed torque can be applied to the ring gear shaft 32a.

In the motor drive mode, the engine 22 is stopped. The motors MG1, MG2 are controlled in such a way that power needed by the second motor MG2 can be applied to the ring gear shaft 32a.

Figure 2:
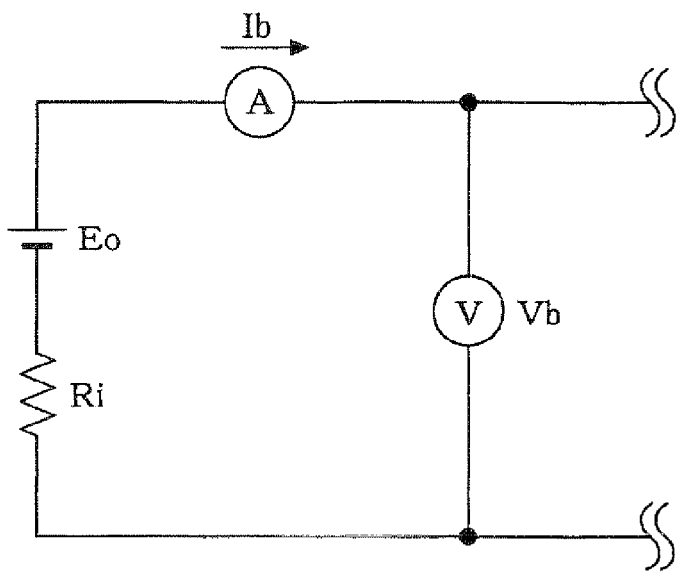
FIG. 2 is a circuit diagram illustrating a simplified model of a battery mounted on the vehicle of FIG. 1.

The charging-discharging of the battery 50 is controlled as follows. FIG. 2 shows a simplified model of the battery 50. The voltage Vb of the battery 50 can be given by the following equation:

$$Vb = Eo - Ri \times Ib \quad (1)$$

In the above equation (1), Eo represents an open voltage (i.e., internal electromotive force) of the battery 50. The open voltage Eo depends on the state of charge (SOC) of the battery 50. Ri represents an internal resistance of the battery 50. The internal resistance R1 depends on a temperature of the battery 50. Ib represents the charging-discharging battery current of the battery 50. As can be understood from the equation (1), the battery voltage Vb depends on each of the open voltage Eo, the internal resistance Ri, and the charging-discharging battery current Ib.

Figure 3:
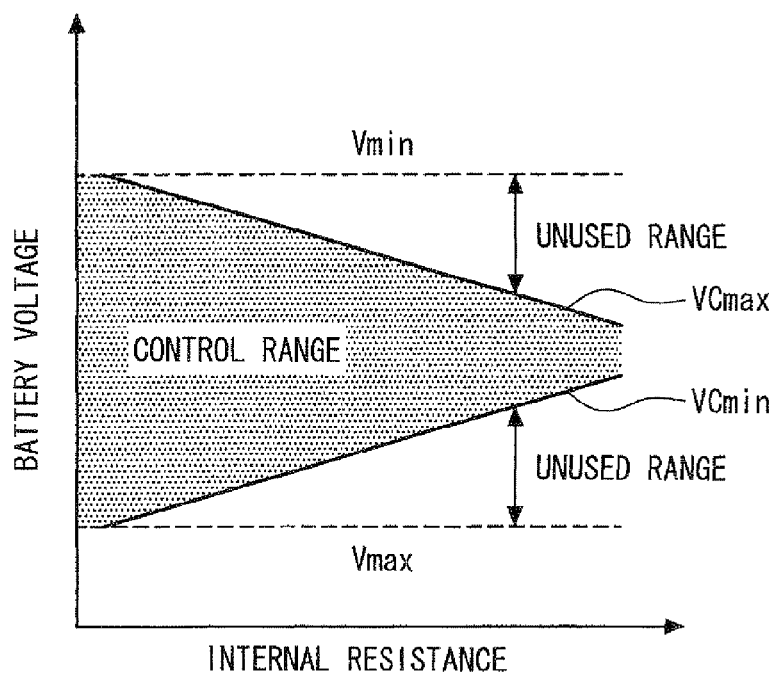
FIG. 3 is a diagram illustrating a battery voltage control range according to a prior art.

According to the conventional technique disclosed in JP-A-2006-211789, the charging-discharging of the battery 50 is controlled in a manner shown in FIG. 3. The conventional technique controls the charging-discharging of the battery 50 based on only the internal resistance Ri of the battery 50 without taking into considerations the charging battery current Ib and the state of charge (SOC) of the battery 50. Therefore, although the battery 50 inherently has a wide charging-discharging performance range between performance lower and upper limits Vmin, Vmax, the charging-discharging of the battery 50 is controlled in a narrow range between control lower and upper limits VCmin, VCmax. Since the prior-art device excessively limits the control range of the battery 50, the control range of the battery 50 becomes much smaller than the inherent performance range of the battery 50. As a result, an unused area of the battery 50 exists so that the inherent performance of the battery 50 cannot be used efficiently.

According to the first embodiment, the charging-discharging battery current Ib of the battery 50 is suitably limited by predicting a behavior of the battery voltage Vb so that the inherent performance of the battery 50 can be used efficiently. Specifically, the charging-discharging battery current Ib is limited such that the battery voltage Vb can satisfy the following inequality:

$$V\min \leq Vb(=Eo-Ri \times Ib) \leq V\max \quad (2)$$

However, since the open voltage Eo can vary according to factors such as a condition of the battery 50 and a manufacturing variation of the battery 50, it is difficult to accurately estimate the open voltage Eo. Therefore, if the charging-discharging battery current Ib is controlled such that the battery voltage Vb can exactly satisfy the inequality (2), there arises a need to take the variations in the open voltage Eo into considerations. As a result, the control range of the battery 50 is excessively limited so that the inherent performance of the battery 50 cannot be used efficiently.

To overcome the above problem, the present inventor has developed a model for the behavior of the battery voltage Vb. The variations in the open voltage Eo can be ignored by using the battery behavior model. The battery behavior model has been developed as follows.

The following equation (3) can be given by differentiating the equation (1) with respect to time:

$$\frac{d}{dt}Vb = \frac{d}{dt}Eo - Ri \times \frac{d}{dt}Ib - Ib \times \frac{d}{dt}Ri \quad (3)$$

Since a variation in each of the open voltage Eo and the internal resistance Ri per unit time is very small, it can be assumed that $dEo/dt=0$, and $dRi/dt=0$. Therefore, the equation (3) can be approximated as follows:

$$\frac{d}{dt}Vb = -Ri \times \frac{d}{dt}Ib \quad (4)$$

The approximated equation (4) represents the battery voltage behavior model that models a relationship of a behavior of the battery voltage Vb to behaviors of the internal resistance Ri and the charging-discharging battery current Ib. Since the equation (4) has no term involving Eo, the variations in the open voltage Eo can be ignored by using the battery voltage behavior model represented by the equation (4).

By the way, the behavior of the battery voltage Vb can be predicted by the following equation:

$$Vb(e) = Vb(pres) + \frac{d}{dt}Vb \cdot \delta t \quad (5)$$

In the equation (5), Vb(e) represents a predicted value of the battery voltage Vb, Vb(pres) represents a present value of the battery voltage Vb, and δt represents a calculation cycle (i.e., prediction cycle).

The term "d/dtVb" on the right hand side of the equation (5) can be calculated using the equation (4). Therefore, the following equation can be derived from the equations (4), (5):

$$Vb(e) = Vb(pres) - Ri \times \frac{d}{dt}Ib \cdot \delta t \quad (6)$$

The inequality (2) can be rewritten as follows using the equation (6):

$$V\min \leq Vb(pres) - Ri \times \frac{d}{dt}Ib \cdot \delta t \leq V\max \quad (7)$$

The following inequality can be derived by modifying the equation (7):

$$\frac{Vb(pres) - V\max}{Ri} \leq \frac{d}{dt}Ib \cdot \delta t \leq \frac{Vb(pres) - V\min}{Ri} \quad (8)$$

In the inequality (8), the term "d/dtIb·δt" represents a variation in the charging-discharging battery current Ib per the calculation cycle δt. Therefore, the inequality (8) represents an allowable variation range for the variation in the charging-discharging battery current Ib per the calculation cycle δt.

In the inequality (8), the term "(Vb(pres)−Vmax)/Ri" represents a lower limit of the allowable variation range, and the term "(Vb(pres)−Vmin)/Ri" represents an upper limit of the allowable variation range.

A minimum allowable value (i.e., minimum control value) Ibmin of the charging-discharging battery current Ib can be given by the following equation;

$$Ib\min = Ib(pres) + \frac{Vb(pres) - V\max}{Ri} = Ib(pres) + \Delta Ib\min \quad (9)$$

A maximum allowable value (i.e., maximum control value) Ibmax of the charging-discharging battery current Ib can be given by the following equation;

$$Ib\max = Ib(pres) + \frac{Vb(pres) - V\min}{Ri} = Ib(pres) + \Delta Ib\max \quad (10)$$

In the first embodiment, the charging-discharging battery current Ib of the battery 50 is controlled in a range between the minimum and maximum allowable values Ibmin, Ibmax calculated by the equations (9), (10). In such an approach, the charging-discharging of the battery 50 is controlled so that the inherent performance of the battery 50 can be used efficiently Specifically, the hybrid ECU 70 controls the charging-discharging of the battery 50 by executing a control program expressed by a flow chart shown in FIGS. 4, 5. For example, the control program is stored in the ROM 74 and executed per the calculation cycle δt during an on-period of the ignition switch 80. The hybrid ECU 70 can serve as a control means by executing the control program.

Figure 4:
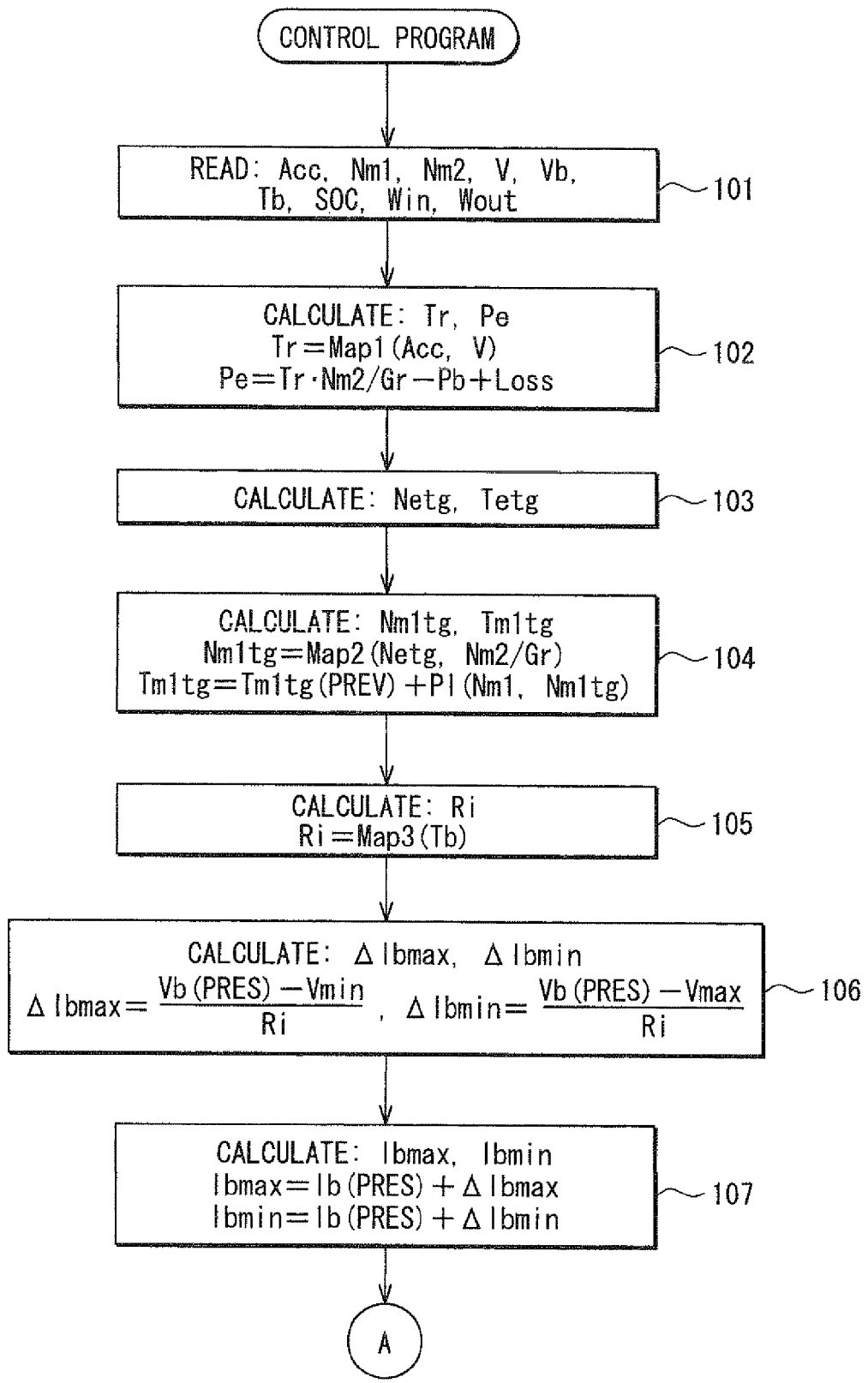
FIG. 4 is a flow diagram of a control program executed by a hybrid electronic control unit of the vehicle of FIG. 1.

As shown in FIG. 4, the control program starts at step 101, where the hybrid ECU 70 reads various data including an accelerator degree Acc from the accelerator pedal sensor 84, a vehicle speed V from the vehicle speed sensor 88, rotational speeds Nm1 Nm2 of the motors MG1, MG2, the battery voltage Vb from the voltage sensor 55, a battery temperature Tb from the temperature sensor 51, a power Pb needed to charge/discharge the battery 50, an input limit Win of the battery 50, and an output limit Wout of the battery 50.

As mentioned previously, the motor ECU 40 receives the rotational position signals from the rotational position sensors 43, 44. The rotational position signals indicate the rotor positions of the first and second motors MG1, MG2, respectively. The motor ECU 40 calculates the rotational speeds Nm1, Nm2 of the motors MG1, MG2 based on the rotational position signals and transmits the rotational speeds Nm1, Nm2 to the hybrid ECU 70.

As mentioned previously, the battery ECU 52 receives the battery voltage Vb from the voltage sensor 55 and the battery temperature Tb from the temperature sensor 51. The battery ECU 52 transmits the battery voltage Vb and the battery temperature Tb to the hybrid ECU 70.

The battery ECU 52 calculates the power Pb based on the SOC of the battery 50 and transmits the power Pb to the hybrid ECU 70. For example, when the power Pb is a positive value, the power Pb indicates power needed to discharge the battery 50. Conversely, when the power Pb is a negative value, the power Pb indicates power needed to charge the battery 50.

The input and output limits Win, Wout of the battery 50 are calculated by the battery ECU 52 as follows. Firstly, input and output limit base values Winbase, Woutbase are calculated based on the battery temperature Tb, for example, using a mapping diagram. Alternatively, each of the input and output limit base values Winbase, Woutbase can be the present charging-discharging power of the battery 50 and calculated as a product of the battery voltage Vb detected by the voltage sensor 55 and the battery current Ib detected by the current sensor 56. That is, Winbase=Woutbase=Vb×Ib. Further, input and output limit correction factors CFin, CFout are calculated based on the SOC of the battery 50, for example, using a mapping diagram. Then, the input limit Win is calculated by multiplying the input limit base value Winbase by the input limit correction factor CFin. That is, Win=Winbase×CFin. Likewise, the output limit Wout is calculated by multiplying the output limit base value Woutbase by the output limit correction factor CFout. That is, Wout=Woutbase×CFout. The input and output limits Win, Wout are sent from the battery ECU 52 to the hybrid ECU 70.

Then, the control program proceeds to step 102, where the hybrid ECU 70 calculates a torque Tr and a power Pe based on the accelerator degree Acc and the vehicle speed V. The torque Tr represents the amount of torque needed to be applied to the ring gear shaft 32a serving as a drive shaft. The power Pe represents the amount of power the engine 22 needs to produce. For example, the torque Tr is calculated by using a mapping diagram Map1 (Acc, V) that defines a mapping of the torque Tr to the accelerator degree Acc and the vehicle speed V. That is, Tr=Map1 (Acc, V). The mapping diagram Map1 (Acc, V) is produced by simulation or actual measurement in advance and stored in the ROM 74.

The power Pe is given by the following equation:

$$Pe = Tr \times \frac{Nm2}{Gr} - Pb + \text{Loss} \quad (11)$$

In the equation (11), Gr represents a gear ratio of the reduction gear 35. Therefore, the term "Nm2/Gr" corresponds to a rotational speed Nr of the ring gear shaft 32a. Alternatively, the rotational speed Nr can be calculated by multiplying the vehicle speed V by a predetermined conversion factor CV. That is, Nm2/Gr=Nr=V×CV.

Then, the control program proceeds to step 103, where the hybrid ECU 70 determines a target rotational speed Netg of the engine 22 and a target torque Tetg based on the power Pe and an operational line that causes the engine 22 to efficiently operate. Specifically, the target rotational speed Netg and the target torque Tetg are obtained as an intersection of the operational line and a line where the Pe (=Ne×Te) is constant.

Then, the control program proceeds to step 104, where the hybrid ECU 70 calculates a target rotational speed Nm1tg of the first motor MG1 from the following equation:

$$Nm1tg = Netg \times \frac{1+\rho}{\rho} - \frac{Nm2}{Gr \times \rho} \quad (12)$$

In the above equation (12), ρ represents a gear ratio of the power splitting device 30.

Further, the hybrid ECU 70 calculates a torque command Tm1tg of the first motor MG1 from the following equation:

$$Tm1tg = Tm1tg(prev) + Kp(Nm1tg - Nm1) + Ki\int(Nm1tg - Nm1)dt \quad (13)$$

In the above equation (13), Tm1tg(prev) represents a previous value of the target torque command Tm1tg, Kp represents a proportional gain, and Ki represents an integral gain. According to the equation (13), the torque command Tm1tg is calculated using proportional, integral (PI) control. Alternatively, the torque command Tm1tg can be calculated using proportional, integral, and differential (PID) control.

Alternatively, the target rotational speed Nm1tg can be calculated by using a mapping diagram Map2 (Netg, Nm2/

Gr) instead of the equation (12). The mapping diagram Map2 (Netg, Nm2/Gr) defines a mapping of the target rotational speed Nm1tg to the target rotational speed Netg of the engine 22 and the Nm2/Gr (=the rotational speed Nr of the ring gear shaft 32a). That is, Nm1tg=Map2 (Netg, Nm2/Gr). The mapping diagram Map2 (Netg, Nm2/Gr) is produced by simulation or actual measurement in advance and stored in the ROM 74.

Figure 6:
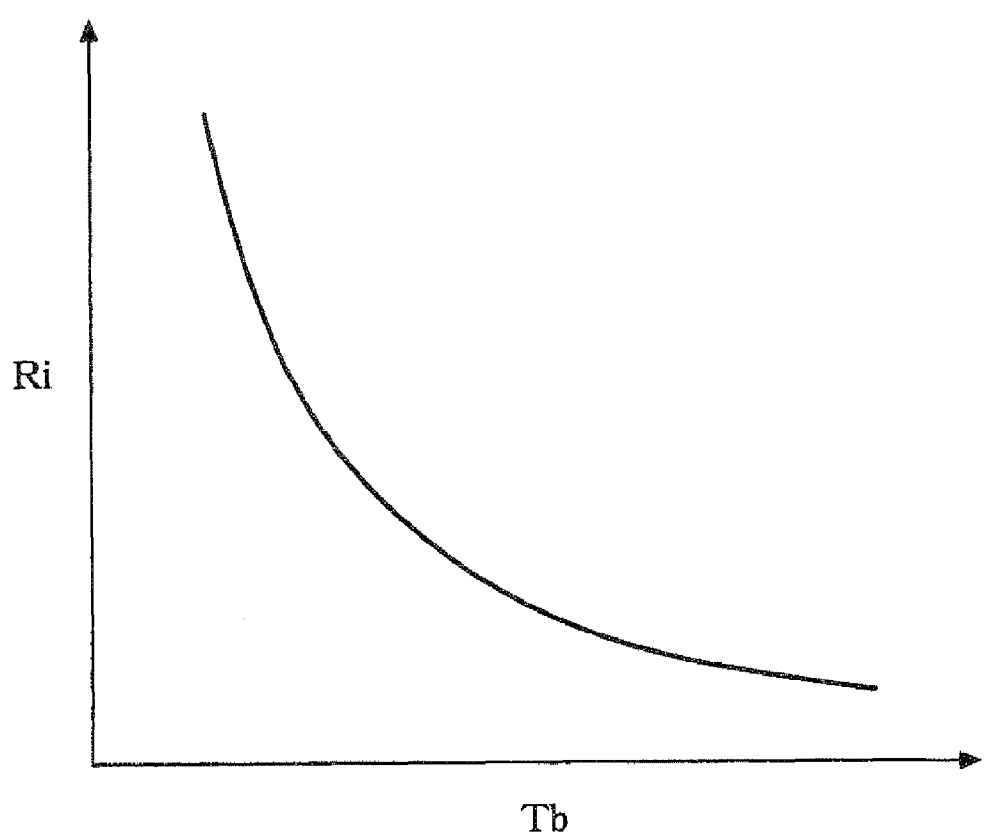
FIG. 6 is a mapping diagram representing a relationship between an internal resistance and a temperature of the battery.

Then, the control program proceeds to step 105, where the hybrid ECU 70 calculates the battery internal resistance Ri corresponding to the present battery temperature Tb using a mapping diagram Map3 (Tb) shown in FIG. 6. As can been seen from FIG. 6, the mapping diagram Map3 is set such that the internal resistance Ri decreases with an increase in the temperature Tb of the battery 50. The hybrid ECU 70 can serve as an estimation means for estimating the battery internal resistance Ri by executing step 105.

Then, the control program proceeds to step 106, where the hybrid ECU 70 calculates a permissible variation ΔIbmax in the maximum allowable value Ibmax of the battery current Ib using a present battery voltage Vb(pres), the internal resistance Ri, and the performance upper limit Vmin of the battery 50. The permissible variation ΔIbmax is given by the following equation:

$$\Delta Ib\ max = \frac{Vb(pres) - V\ min}{Ri} \tag{14}$$

Likewise, the hybrid ECU 70 calculates a permissible variation ΔIbmin in the minimum allowable value Ibmin of the battery current Ib using the present battery voltage Vb(pres), the internal resistance Ri, and the performance upper limit Vmin of the battery 50. The permissible variation ΔIbmin is given by the following equation:

$$\Delta Ib\ min = \frac{Vb(pres) - V\ max}{Ri} \tag{15}$$

The equations (14), (15) can be derived from the inequality (8). The permissible variation ΔIbmax corresponds to an upper limit of the allowable variation range for the variation in the battery current Ib per the calculation cycle δt. The permissible variation ΔIbmin corresponds to a lower limit of the allowable variation range for the variation in the battery current Ib per the calculation cycle δt.

As can be seen from the equations (14), (15), when the performance upper and lower limits Vmin, Vmax are considered to be constant, the permissible variations ΔIbmin, ΔIbmax can be expressed using the internal resistance Ri and the battery voltage Vb as parameters (i.e., variables). In such a case, the permissible variations ΔIbmin, ΔIbmax can be calculated by using mapping diagrams Map4 (Ri, Vb), Map5 (Ri, Vb) instead of the equations (14), (15), respectively, The mapping diagram Map4 (Ri, Vb) defines a mapping of the permissible variation ΔIbmin to the internal resistance Ri and the battery voltage Vb. That is, ΔIbmin=Map4 (Ri, Vb). The mapping diagram Map5 (Ri, Vb) defines a mapping of the permissible variation ΔIbmax to the internal resistance Ri and the battery voltage Vb. That is, ΔIbmax=Map5 (Ri, Vb). The mapping diagrams Map4 (Ri, Vb), Map5 (Ri, Vb) are produced by simulation or actual measurement in advance and stored in the ROM 74.

Then, the control program proceeds to step 107, where the hybrid ECU 70 calculates the maximum allowable value Ibmax by adding the permissible variation ΔIbmax to a present battery current Ib(pres). That is, Ibmax=Ib(pres)+ΔIbmax. Likewise, the hybrid ECU 70 calculates the minimum allowable value Ibmin by subtracting the permissible variation ΔIbmin from the present battery current Ib(pres). That is, Ibmin=Ib(pres)+ΔIbmin.

Figure 5:
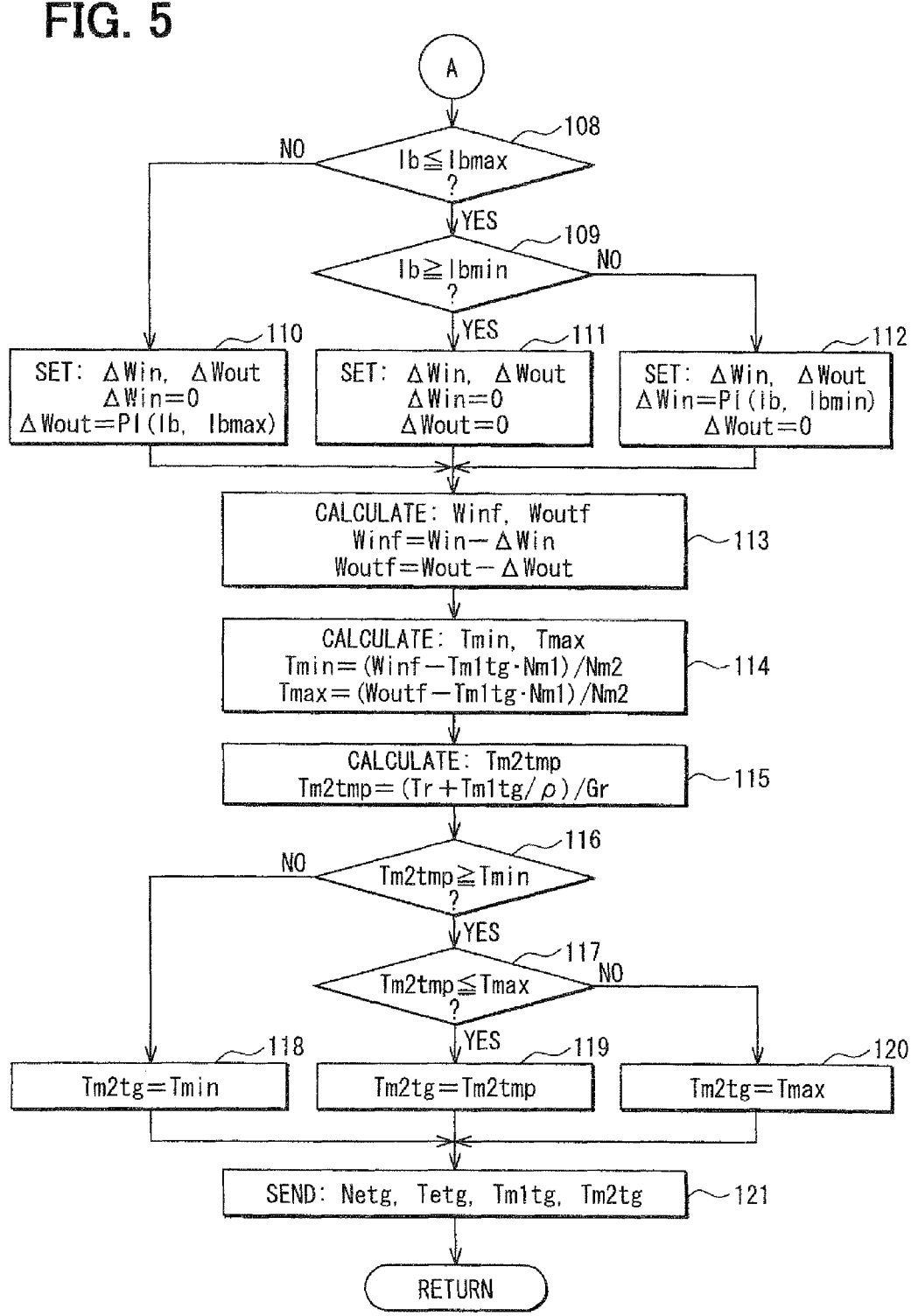
FIG. 5 is a flow diagram following the flow diagram of FIG. 4.

Then, the control program proceeds to step 108 shown in FIG. 5, where the hybrid ECU 70 compares the present battery current Ib with the maximum allowable value Ibmax. If the present battery current Ib exceeds the maximum allowable value Ibmax corresponding to NO at step 108, the hybrid ECU 70 determines that the battery 50 is overdischarged, and the control program proceeds to step 110. At step 110, the hybrid ECU 70 sets a correction value ΔWin for the input limit Win of the battery 50 to zero. That is, ΔWin=zero. Further, the hybrid ECU 70 calculates a correction value ΔWout for the output limit Wout of the battery 50 in such a manner that the battery current Ib can be equal to the maximum allowable value Ibmax. For example, the correction value ΔWout can be calculated using Pi control as follows:

$$\Delta Wout = PI(Ib, Ib\ max) \tag{16}$$
$$= \Delta Wout(prev) + Kp1(Ib - Ib\ max) + Ki1 \int (Ib - Ib\ max)dt$$

In the above equation (16), ΔWout(prev) represents a previous value of the correction value ΔWout, Kp1 represents a proportional gain, and Ki1 represents an integral gain. Alternatively, the correction value ΔWout can be calculated using PID control.

Conversely, if the present battery current Ib is equal to or less than the maximum allowable value Ibmax corresponding to YES at step S108, the hybrid ECU 70 determines that the battery 50 is not overdischarged, and the control program proceeds to step 109. At step 109, the hybrid ECU 70 compares the present battery current Ib with the minimum allowable value Ibmin. If the present battery current Ib is below the minimum allowable value Ibmin corresponding to NO at step 109, the hybrid ECU 70 determines that the battery 50 is overcharged, and the control program proceeds to step 112. At step 112, the hybrid ECU 70 sets the correction value ΔWout to zero. That is, ΔWout=zero. Further, the hybrid ECU 70 calculates the correction value ΔWin in such a manner that the battery current Ib can be equal to the minimum allowable value Ibmin. For example, the correction value ΔWin can be calculated using Pi control as follows:

$$\Delta Win = PI(Ib, Ibmin) = \Delta Win(prev) + Kp2(Ib - Ibmin) + Ki2\int(Ib - Ibmin)dt \tag{17}$$

In the above equation (17), ΔWin(prev) represents a previous value of the correction value ΔWin, Kp2 represents a proportional gain, and Ki2 represents an integral gain. Alternatively, the correction value ΔWin can be calculated using PID control.

Conversely, If the present battery current Ib is equal to of greater than the minimum allowable value Ibmin corresponding to YES at step 109, the hybrid ECU 70 determines that the battery 50 is not overcharged, and the control program proceeds to step 111. In summary, when the battery current Ib is within the range between the maximum and minimum allowable values Ibmax, Ibmin (i.e., Ibmax≧Ib≧Ibmin), the hybrid ECU 70 determines that the battery 50 is in a normal condition, and the control program proceeds to step 111. At step 111, the hybrid ECU 70 sets each of the correction values ΔWin, ΔWout to zero. That is, ΔWin=ΔWout=zero.

After the correction values ΔWin, ΔWout are set at any one of steps 110-112, the control program proceeds to step 113, where the hybrid ECU 70 calculates an input allowable limit Winf by subtracting the correction value ΔWin from the input limit Win. That is, Winf=Win−ΔWin. Likewise, the hybrid ECU 70 calculates an output allowable limit Woutf by subtracting the correction value ΔWout from the output limit Wout.

Then, the control program proceeds to step 114, where the hybrid ECU 70 calculates lower and upper limits Tmin, Tmax of the torque of the second motor MG2 using the input and output allowable limits Win, Woutf, the torque command Tm1$tg$ of the first motor MG1, and the rotational speeds of the motors MG1, MG2. The lower and upper limits Tmin, Tmax are given by the following equations $$T\min = \frac{W\inf - Tm1tg \cdot Nm1}{Nm2} \quad (18)$$

$$T\max = \frac{Woutf - Tm1tg \cdot Nm1}{Nm2} \quad (19)$$

In the above equations (18), (19), the term "Tm1$tg$·Nm1" corresponds to power consumed or generated by the first motor MG1.

Then, the control program proceeds to step 115, where the hybrid ECU 70 calculates a temporary torque limit Tm2$tmp$ of the second motor MG2 using the torque Tr, the torque command Tm1$tg$, the gear ratio ρ of the power splitting device 30, and the gear ratio Gr of the reduction gear 35. The temporary torque limit Tm2$tmp$ is given as follows:

$$Tm2tmp = \frac{Tr + Tm1tg/\rho}{Gr}$$

Then, the control program proceeds to step 116, where the hybrid ECU 70 compares the temporary torque limit Tm2$tmp$ with the lower torque limit Tmin. If the temporary torque limit Tm2$tmp$ is below the lower torque limit Tmin corresponding to NO at step 116, the control program proceeds to step 118. At step 118, the hybrid ECU 70 sets a torque command Tm2$tg$ of the second motor MG2 to the lower torque limit Tmin. That is, Tm2$tg$=Tmin.

Conversely, if the temporary torque limit Tm2$tmp$ is equal to or greater than the lower torque limit Tmin corresponding to YES at step 116, the control program proceeds to step 117. At step 1177 the hybrid ECU 70 compares the temporary torque limit Tm2$tmp$ with the upper torque limit Tmax. If the temporary torque limit Tm2$tmp$ exceeds the upper torque limit Tmax corresponding to NO at step 117, the control program proceeds to step 120. At step 120, the hybrid ECU 70 sets the torque command Tm2$tg$ of the second motor MG2 to the upper torque limit Tmax. That is, Tm2$tg$=Tmax.

Conversely, if the temporary torque limit Tm2$tmp$ is equal to or less than the upper torque limit Tmax corresponding to YES at step 117, the control program proceeds to step 119. At step 119, the hybrid ECU 70 sets the torque command Tm2$tg$ to the temporary torque limit Tm2$tmp$. That is, Tm2$tg$=Tm2$tmp$.

After the torque command Tm2$tg$ of the second motor MG2 is set at any one of steps 118-120, the control program proceeds to step 121. At step 121, the hybrid ECU 70 transmits the target rotational speed Netg and the target torque Tetg of the engine 22 to the engine ECU 24. Further, the hybrid ECU 70 transmits the torque commands Tm1$tg$, Tm2$tg$ of the motors MG1, MG2 to the motor ECU 40. Then, the control program is finished.

The engine ECU 24 controls the engine 22 in accordance with the target rotational speed Netg and the target torque Tetg.

The motor ECU 40 controls the inverter circuits 41, 42 so that the motors MG1, MG2 can be driven according to the torque commands Tm1$tg$, Tm2$tg$.

As described above, according to the first embodiment, the behavior of the battery voltage Vb is predicted based on the behaviors of the internal resistance Ri and the battery current Ib using the battery voltage behavior model that models the relationship of the behavior of the battery voltage Vb to the behaviors of the internal resistance Ri and the battery current Ib. The battery current Ib is limited such that the battery voltage Vb can be within a predetermined voltage range (i.e., range between Vmax, Vmin). In this way, the battery current Ib is controlled based the battery current Ib and the state of charge of the battery in addition to the internal resistance Ri. Therefore, the charging-discharging performance of the battery can be used efficiently.

Second Embodiment

Figure 7:
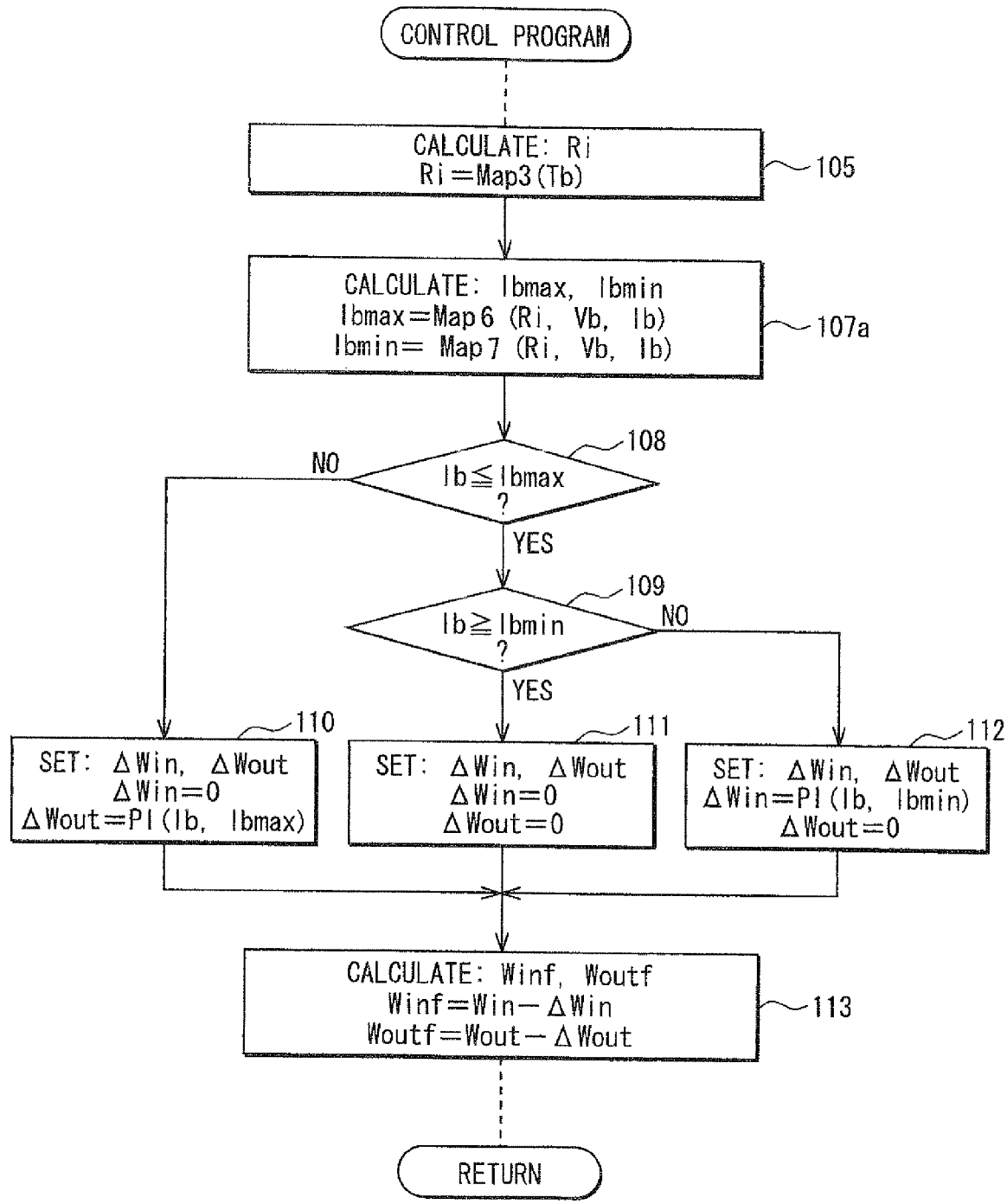
FIG. 7 is a flow diagram of a control program according to a second embodiment of the present invention.

A second embodiment of the present invention is described below with reference to FIG. 6. A difference between the first and second embodiments is in that steps 106, 107 of FIG. 4 are replaced with step 107$a$ of FIG. 7. At step 107$a$, the hybrid ECU 70 calculates the maximum and minimum allowable values Ibmax, Ibmin using mapping diagrams Map6 (Ri, Vb, Ib), Map7 (Ri, Vb, Ib), respectively. The mapping diagrams Map6 (Ri, Vb, Ib), Map7 (Ri, Vb, Ib) are formed to satisfy the following inequality (20) that is derived from the inequality (2).

$$\frac{Eo - V\max}{Ri} \le Ib \le \frac{Eo - V\min}{Ri} \quad (20)$$

From the inequality (20), the maximum and minimum allowable values Ibmax, Ibmin can be given by the following equations:

$$Ib\max = \frac{Eo - V\min}{Ri} \quad (21)$$

$$Ib\min = \frac{Eo - V\max}{Ri} \quad (22)$$

The equations (21), (22) can be rewritten as follows by using the equation (1):

$$Ib\max = \frac{Vb + Ri \times Ib - V\min}{Ri} \quad (23)$$

$$Ib\min = \frac{Vb + Ri \times Ib - V\max}{Ri} \quad (24)$$

As can be seen from the equations (23), (24), when the performance upper and lower limits Vmin, Vmax are considered to be constant, the maximum and minimum allowable values Ibmax, Ibmin can be expressed using the internal resistance Ri, the battery voltage Vb, and the battery current Ib as parameters. Therefore, in the mapping diagrams Map6 (Ri, Vb, Ib), Map7 (Ri, Vb, Ib), the permissible variations ΔIbmin, ΔIbmax can be expressed using the internal resistance Ri, the battery voltage Vb, and the battery current Ib as parameters. The permissible variations Ibmin, Ibmax can be calculated using the mapping diagrams Map6 (Ri, Vb, Ib), Map7 (Ri, Vb, Ib).

Therefore, the second embodiment can have the same effect as the first embodiment.

Third Embodiment

Figure 8:
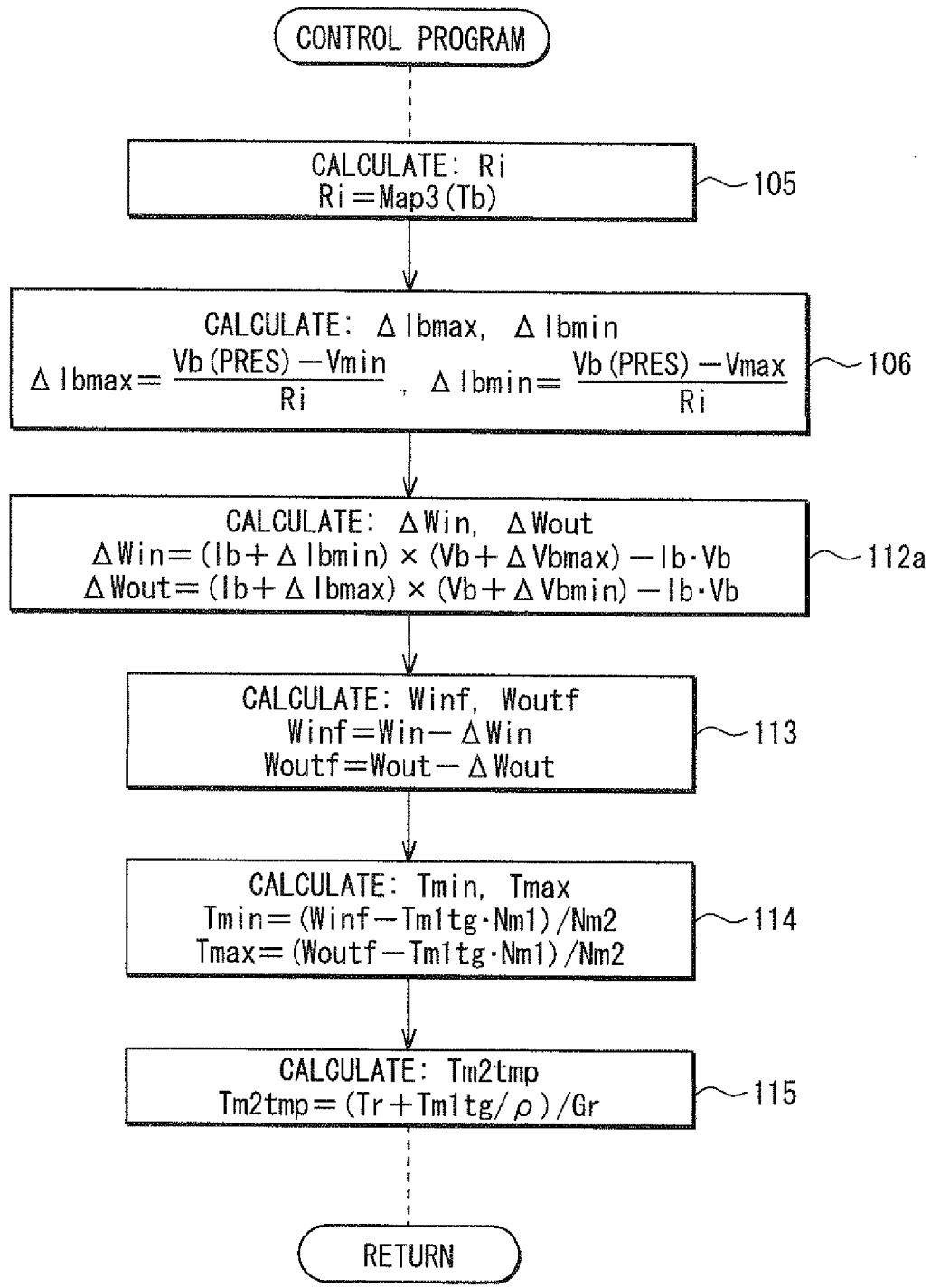
FIG. 8 is a flow diagram of a control program according to a third embodiment of the present invention.

A third embodiment of the present invention is described below with reference to FIG. 8. A difference between the first and third embodiments is in that steps 108-112 of FIG. 5 are replaced with step 112a of FIG. 8. At step 112a, the hybrid ECU 70 calculates the correction values ΔWin, ΔWout as follows:

$$\Delta Win = Ib\min \times V\max - Ib \times Vb \quad (31)$$

$$\Delta Wout = Ib\max \times V\min - Ib \times Vb \quad (32)$$

The above equations (31), (32) are explained below.

The following inequality can be derived from the inequality (8):

$$Vb(pres) - V\max \le Ri \times \frac{d}{dt} Ib \cdot \delta t \le Vb(pres) - V\min \quad (33)$$

The above inequality (33) can be rewritten as follows using the equation (4):

$$V\min - Vb(pres) \le \frac{d}{dt} Vb \cdot \delta t \le V\max - Vb(pres) \quad (34)$$

When it is assumed that Vmin−Vb(pres)=ΔVbmin, and Vmax−Vb(pres)=ΔVbmax, the above inequality (34) can be rewritten as follows:

$$\Delta Vb\min \le \frac{d}{dt} Vb \cdot \delta t \le Vb\max \quad (35)$$

Since Ibmin=Ib(pres)+ΔIbmin, the correction value ΔWin can be given by the following equation:

$$\Delta Win = Ib\min \times V\max - Ib(pres) \times Vb(pres) \quad (36)$$
$$= \{Ib(pres) + \Delta Ib\min\} \times \{Vb(pres) + \Delta Vb\max\} - Ib(pres) \times Vb(pres)$$
$$= Ib(pres) \times \Delta Vb\max + \Delta Ib\min \times Vb(pres) + \Delta Ib\min \times \Delta Vb\max$$

Since Ibmax=Ib(pres)+ΔIbmax, the correction value ΔWout can be given by the following equation:

$$\Delta Wout = Ib\max \times V\min - Ib(pres) \times Vb(pres) \quad (37)$$
$$= \{Ib(pres) + \Delta Ib\max\} \times \{Vb(pres) + \Delta Vb\min\} - Ib(pres) \times Vb(pres)$$
$$= Ib(pres) \times \Delta Vb\min + \Delta Ib\max \times Vb(pres) + \Delta Ib\max \times \Delta Vb\min$$

According to the third embodiment, the behavior of the battery voltage Vb is predicted using the battery voltage behavior model that models the relationship of the behavior of the battery voltage Vb to the behaviors of the internal resistance Ri and the charging-discharging battery current Ib. The charging-discharging power (i.e., Win, Wout) of the battery 50 is limited such that the battery voltage Vb can be within a predetermined voltage range (i.e., range between Vmax, Vmin). Thus, the third embodiment can have the same effect as the first embodiment.

(Modifications)

The embodiments described above may be modified in various ways. The present invention can be applied to vehicles other than a hybrid electric vehicle. For example, the present invention can be used to control charging-discharging of a battery mounted on an electric vehicle running on only an electric motor and an engine vehicle running on only an engine.

Such changes and modifications are to be understood as being within the scope of the present invention as defined by the appended claims.

What is claimed is:

1. An apparatus for controlling charging-discharging of a battery mounted on a vehicle, the apparatus comprising:
   an estimation circuit configured to estimate an internal resistance of the battery;
   a detection circuit configured to detect a charging-discharging current of the battery; and
   a control circuit configured to predict a behavior of a voltage of the battery based on behaviors of the internal resistance and the charging-discharging current of the battery, the battery voltage depending on an internal condition of the battery,
   wherein the control circuit limits the charging-discharging current or a charging-discharging power of the battery based on the predicted behavior of the battery voltage in such a manner that the battery voltage is within a predetermined voltage range, and
   wherein the control circuit limits an amount of change in the charging-discharging current or the charging-discharging power of the battery per unit time according to the predicted behavior of the battery voltage and the internal resistance of the battery.

2. The apparatus according to claim 1, wherein the control circuit has a battery voltage behavior model that models a relationship of the behavior of the battery voltage to the behaviors of the internal resistance and the charging-discharging current of the battery, and wherein the control circuit predicts the behavior of the battery voltage using the battery voltage behavior model.

3. An apparatus for controlling charging-discharging of a battery mounted on a vehicle, the apparatus comprising:
- an estimation means for estimating an internal resistance of the battery;
- a detection means for detecting a charging-discharging current of the battery; and
- a control means for predicting a behavior of a voltage of the battery based on behaviors of the internal resistance and the charging-discharging current of the battery, the battery voltage depending on an internal condition of the battery,
- wherein the control means limits the charging-discharging current or a charging-discharging power of the battery based on the predicted behavior of the battery voltage in such a manner that the battery voltage is within a predetermined voltage range, and
- wherein the control means limits an amount of change in the charging-discharging current or the charging-discharging power of the battery per unit time according to the predicted behavior of the battery voltage and the internal resistance of the battery.

4. The apparatus according to claim 3, wherein the control means has a battery voltage behavior model that models a relationship of the behavior of the battery voltage to the behaviors of the internal resistance and the charging-discharging current of the battery, and wherein the control means predicts the behavior of the battery voltage using the battery voltage behavior model.

5. An method of controlling charging-discharging of a battery mounted on a vehicle, the method comprising:
- estimating an internal resistance of the battery;
- detecting a charging-discharging current of the battery;
- predicting a behavior of a voltage of the battery based on behaviors of the internal resistance and the charging-discharging current of the battery, the battery voltage depending on an internal condition of the battery;
- limiting the charging-discharging current or a charging-discharging power of the battery based on the predicted behavior of the battery voltage in such a manner that the battery voltage is within a predetermined voltage range; and
- limiting an amount of change in the charging-discharging current or the charging-discharging power of the battery per unit time according to the predicted behavior of the battery voltage and the internal resistance of the battery.

6. The method according to claim 5, wherein the method further comprises predicting the behavior of the battery voltage using a battery voltage behavior model that models a relationship of the behavior of the battery voltage to the behaviors of the internal resistance and the charging-discharging current of the battery.

* * * * *